US008155085B2

(12) United States Patent
Kawakami et al.

(10) Patent No.: US 8,155,085 B2
(45) Date of Patent: Apr. 10, 2012

(54) MOBILE COMMUNICATION METHOD AND ACCESS ROUTER

(75) Inventors: Tetsuya Kawakami, Kanagawa (JP);
Genadi Velev, Darmstadt (DE); Jon Schuringa, Langen (DE)

(73) Assignee: Panasonic Corporation, Osaka (JP)

( * ) Notice: Subject to any disclaimer, the term of this patent is extended or adjusted under 35 U.S.C. 154(b) by 560 days.

(21) Appl. No.: 12/373,554

(22) PCT Filed: Jul. 26, 2007

(86) PCT No.: PCT/JP2007/064652
§ 371 (c)(1),
(2), (4) Date: Feb. 5, 2009

(87) PCT Pub. No.: WO2008/013218
PCT Pub. Date: Jan. 31, 2008

(65) Prior Publication Data
US 2010/0002652 A1 Jan. 7, 2010

(30) Foreign Application Priority Data
Jul. 28, 2006 (JP) .................................. 2006-207057

(51) Int. Cl.
*H04W 4/00* (2009.01)
(52) U.S. Cl. ........................................ 370/331; 455/436
(58) Field of Classification Search .................. 370/331; 455/436
See application file for complete search history.

(56) References Cited

U.S. PATENT DOCUMENTS

| 7,483,411 B2 * | 1/2009 | Weinstein et al. ............ 370/338 |
| 2003/0026241 A1 * | 2/2003 | Ono et al. ..................... 370/349 |
| 2004/0137888 A1 | 7/2004 | Ohki |
| 2004/0176095 A1 | 9/2004 | Yamada et al. |
| 2005/0007994 A1 * | 1/2005 | Fukuzawa et al. ............ 370/349 |
| 2005/0083885 A1 | 4/2005 | Ikeda et al. |
| 2005/0180355 A1 | 8/2005 | Kim et al. |

FOREIGN PATENT DOCUMENTS

| JP | 2002-271377 A | 9/2002 |
| JP | 2003-018192 A | 1/2003 |
| JP | 2004-266616 A | 9/2004 |
| JP | 2005-012718 A | 1/2005 |
| JP | 2005-143086 A | 6/2005 |
| JP | 2005-236980 A | 9/2005 |

OTHER PUBLICATIONS

International Search Report for PCT/JP2007/064652.
Narten et al: Neighbor Discovery for IP Version 6 (IPv6), Dec. 1998.
Giaretta et al: Network-based localized mobility management (NETLMM) with distributed anchor routers <draft-giaretta-netlmm-protocol-00.txt>, Oct. 2005.

* cited by examiner

*Primary Examiner* — Sai-Ming Chan
(74) *Attorney, Agent, or Firm* — Pearne & Gordon LLP

(57) ABSTRACT

A technology is disclosed in which, when a normal mobile node (that does not newly provide a dedicated function) is used, signaling for reconfiguring a tunnel during a mobile node movement is reduced and, furthermore, packet loss is reduced. In the technology, when an MN moves from under the control of an AR2 that is a movement origin to be under the control of an AR3 that is a movement destination, the AR3 receives an NS transmitted from the MN to the AR2. The AR3 that receives the NS destined to the AR2 transmits a "Location Update" to the AR2. The AR2 that receives the "Location Update" uses an MN management table of the relevant MN and creates "Prefix Information" and returns the "Prefix Information" to the AR3. A tunnel is established between access routers of the AR2 and AR3 through use of the "Prefix Information", and a packet destined to the MN is transferred to the MN via the tunnel.

4 Claims, 9 Drawing Sheets

FIG. 2

| MN ID (Mac /LL address) | On Link Flag | Refresh timer | IP address(es) using tunnel | IP address generated by this AR | Transmission timer |
|---|---|---|---|---|---|
| MN1 | 1 | 35m40s | MN1-1, MN1-2 | MN1-3 | 0 |
| MN2 | 1 | - | - | MN2-3 | 55m12s |
| MN3 | 0 | - | - | MN3-3 | 15m56s |

FIG. 4

| RA_Type | Prefix Option | | A bit | PL time | VL time | Timing to send |
|---|---|---|---|---|---|---|
| | Prefix | | | | | |
| RA_Type1 | nAR's Prefix | | 1 | RT | RT | Periodically |
| | Special prefix of this netlmm domain ※1 | | 0 | Default | Default | |
| RA_Type2 | nAR's prefix | | 1 | RT | RT | When receiving PI |
| | oAR's prefix | | 1 | 0 | 0/RT ※2 | |
| | Other prefix(es) using tunnel | | 1 | 0 | RT | |
| | Special prefix of this netlmm domain | | 0 | Default | Default | |
| RA_Type3 | Other prefix(es) using tunnel | | 1 | 0 | RT | When expiring RT |

MOBILE COMMUNICATION METHOD AND ACCESS ROUTER

TECHNICAL FIELD

The present invention relates to a mobile communication method and an access router.

BACKGROUND ART

Mobile control methods for internet protocol (IP) communication in mobile communication, such as mobile phones, are currently being examined. In local mobility over a limited area in which a single network manager performs a service, a method is being examined for performing network control without a terminal changing an IP address when the terminal moves (for example, Internet Engineering Task Force [IETF] netlmm group). Regarding a demand such as this, a device on a network side is required to support movement processing of the terminal and perform control such that an IP packet is transferred to an appropriate base station to which the mobile terminal is connected. According to a draft stating specific requirement conditions, in an access network such as this, improvement in usage efficiency in wired segments of the network and similar improvement in usage efficiency in wireless segments of the network are required to improve performance of a handover. At the same time, movement control is also required to be performed without the IP address of the terminal being changed. Moreover, a requirement condition is given that changes cannot be made to an IP stack of the terminal to actualize the requirements described above.

In Mobile IP that is a representative movement control, a packet is transferred to a correct location by a tunnel technology that uses an IP address (referred to, hereinafter, as a home address [HoA]) indicating an address of a host and an IP address (referred to, hereinafter, as a care-of-address [CoA]) indicating a location. However, in mobile IP (MIP), processes are performed by the terminal, such as the terminal itself creating a new address (CoA) and registering a mapping of the address to a home agent (HA). These processes cause decrease in handover performance. Because the tunnel ends at the terminal, the tunnel is used even in a wireless segment, causing a problem with overhead of a tunnel header in data. In MIP, to improve handover performance, an HMIP is also being examined that introduces a mobile anchor point (MAP) that manages position registration in a limited area. In this case, within a certain limited area, only position registration is required to be performed to the MAP. Therefore, signaling distance and time are shortened. However, duplicate tunnel headers are required, and network resources decrease. In addition, because the terminal is required to newly perform signaling to the MAP, a change is required to be made to the IP stack of the terminal. Therefore, in an access network in which a single network manager performs a service, as described above, various proposals are being made to efficiently perform local mobility without changes being made to the terminal.

FIG. 6 is a configuration of an access network described in Non-patent Document 1 below. A localized mobility management domain (LMMD)#1 that is an access network is a network in which a border gateway (BG) and access routers (AR#1, AR#2, and AR#3) are connected. The BG serves as a connection point with an external network to which a correspondent node (CN) is connected. The AR#1, the AR#2, and the AR#3 function as wireless base stations connecting with a mobile terminal (mobile node [MN]) and serve as relay devices. In the example, to simplify explanation, the access router and the wireless base station (BS or AP) are provided as functions of a same device. An area of a network such as this is referred to, hereinafter, as a "Netlmm" domain.

In the Netlmm domain, the AR#1, the AR#2, and the AR#3 each have a different prefix (prefix#1, prefix#2, and prefix#3). Moreover, each AR#1, AR#2, and AR#3 has a table allowing the AR#1, the AR#2, and the AR#3 to respectively acquire IP addresses of the AR#1, the AR#2, and the AR#3 having the "prefix#1", the "prefix#2", and the "prefix#3" by using the "prefix#1", the "prefix#2", and the "prefix#3".

In FIG. 6, 1. when an MN#1 is started, the MN#1 acquires the "prefix#1" from the AR#1 to which the MN#1 is connected and creates an IP address of the MN#1 itself (IP-MN#1). The AR#1 at this time is referred to as a home access router (HAR). Because the MN#1 communicates using the IP address (IP-MN#1) created from the "prefix#1" that can be routed, when the MN#1 is connected under the control of the HAR, the MN#1 can perform communication by a normal IP routing without using a tunnel when communicating with the CN.

When the MN#1 moves to be under the control of another AR, a following process is performed.

2. When the MN#1 transmits a router solicitation message (referred to, hereinafter, as RS) after acknowledging disconnection from the AR#1 before movement, and the MN#1 receives a router advertisement message (referred to, hereinafter, as RA) from a new AR, or when the MN#1 receives a periodic RA from a new AR and the like and receives a different "prefix", the MN#1 recognizes that the MN#1 itself has moved to be under the control of another AR (AR#2, herein). At this time, the MN#1 uses a Global IP address that the MN#1 itself is using and transmits a message (Activate message) indicating that the MN#1 wishes to perform communication.

3. The AR#2 that receives the Activate message recognizes the "prefix#1" from the Global IP address being used and transmits a position update message (Location Update) to the AR#1 having the "prefix#1". An AR#2 such as this is referred to as a visited access router (VAR).

4. The HAR (=AR#1) that receives the Location Update acknowledges that the MN#1 that had been under the control of the HAR itself has moved to be under the control of the VAR (=AR#2). The HAR (=AR#1) establishes a tunnel between the HAR (=AR#1) and the VAR (=AR#2). After receiving a packet destined to the MN#1, the HAR (=AR#1) uses the tunnel and transfers the packet to the VAR (=AR#2). As a result, the VAR (=AR#2) can transmit the received packet destined to the MN#1 to the MN#1 connected to be under the control of the VAR (=AR#2) itself. Through use of the tunnel between the HAR and the VAR such as this, the MN can continue communication always using a same IP address within the "Netlmm" domain.

FIG. 7 shows an overview of a communication performed using the tunnel during movement of the MN. As shown in FIG. 7(a), when the MN is turned ON (Power On), the MN acquires a "prefix1" from an AR1 to which the MN is connected and creates an address IP1. Then, as shown in FIG. 7(b), when the MN connects to an AR2 as a result of movement (Start Communication), the MN transmits an "Activate Message" using the IP1. As a result, the AR2 operates as the VAR of the MN, and a tunnel is established between the AR1 and the AR2. Here, even when the MN starts communication with the CN while under the control of the AR2, the MN performs the communication using the tunnel between the AR1 and the AR2. Moreover, as shown in FIG. 7(c), when the MN moves to be under the control of an AR3 (Continue Communication), the AR3 becomes the VAR of the MN. Transfer of the packet addressed to the IP1 can be performed as a result of the tunnel being changed to be between the AR1 and AR3. In this way, when the MN moves within the "Netlmm" domain, the MN can continue communication without changing the IP address.

As another conventional example, neighbor discovery is described in Non-patent Document 2, below.

Non-Patent Document 1: draft-diaretta-netlmm-protocol-00-txt, FIG. 1—Reference architecture, Oct. 14, 2005

Non-Patent Document 2: RFC2461

However, although "Netlmm" requires that a configuration of the MN is not changed, when a method such as this is used, the MN is required to give notification of an IP address that the MN wishes to use as the "Activate Message", when the MN moves. The configuration of the MN is required to be changed.

When, in adherence to the requirement conditions of "Netlmm", a normal MN of which the configuration is not changed is used, an operation such as the following can be considered. Ordinarily, when the MN receives a new "Prefix", the MN creates a new IP address when an A bit within a "Prefix Option" of the "Prefix" is set, and performs a duplicate address detection (DAD). In this case, an AR that receives a Neighbor Solicitation message (referred to, hereinafter, as NS) for checking the DAD of the new address cannot recognize the movement of the MN and is considered to operate as the HAR of the MN at the relevant address. However, in this case, if the MN is an MN including a MIP because the MN has moved to a different network, the CoA is changed and a Binding Update message (referred to, hereinafter, as BU) is transmitted to the HA.

When it is thought that a Detecting Network Attachment (DNA) that detects network movement, shown in Non-patent Document 2, is used, the MN does not perform acknowledgement that the MN has moved to a different network. However, the MN still creates the new IP address and performs DAD. In this case as well, the MN creates an IP address every time the MN moves, causing the MN to hold a plurality of IP addresses. In an instance such as this, the MN may communicate or may be communicating using the address before movement. In an instance such as this, a tunnel is required to be established between the MN and the AR holding the relevant "Prefix", and a transfer of the packet is required to be performed correctly. However, ordinarily, the AR of a movement destination cannot know which AR is the HAR of the address used by the MN to perform communication until the AR of the movement destination receives the packet from the MN using the "Prefix" before movement. Therefore, the tunnel is not established until data from the MN is received. A packet loss occurs. Moreover, because the network cannot control which IP address the MN uses, a problem occurs in that a signaling amount for control, such as a large number of tunnels being established for the plurality of IP addresses used by the MN and the tunnels being reconfigured every time the MN moves, increases.

Hereafter, an operation is described of when a normal MN is used to meet the requirement conditions of "Netlmm". FIG. 8 shows an overview of communication performed during movement. FIG. 9 shows a sequence during the movement. In FIG. 8, AR1 to AR5 are present. MN starts at the AR1 and moves in a direction towards the AR 5. The MN creates an address using a "Prefix" received from the AR1 to AR5 every time the MN moves, and communicates using the created addresses. FIG. 8(a) shows a state in which the MN is performing communication under the control of the AR3. At this time, it is assumed that the MN has started communication using the respective addresses of the AR1, the AR2, and the AR 3, while being connected to the AR2, and the AR 3. Therefore, the HAR of the addresses IP1, IP2, and IP3 are respectively AR1, AR2, and AR3. Respective communication with the AR1, the AR2, and the AR 3 are performed by a tunnel being established between the AR1, the AR2, and the AR 3 and the AR3 that becomes the VAR.

FIG. 8(b) shows a state in which the MN moves to the AR5. When the three communication operations are continued, every time the AR5 receives data from the MN, the AR5 acknowledges the AR serving as the HAR from the "Prefix" and reconfigures the tunnel. When communication using an address IP4 has not been performed, the tunnel to the AR4 is not established. In this way, because the created addresses increase every time the MN moves, a load of reconfiguring the tunnel during movement increases as the IP addresses used increases in the MN.

FIG. 9 shows a sequence during movement. In the diagram, a flow of a process performed when the MN that has been communicating under the control of the AR2 moves to be under the control of the AR3. For example, the MN had been connected to the AR1 before being connected to the AR2 and has been communicating using the address IP1 of when the MN was connected to the AR1. When a layer 2 handover (L2 HO from AR2 to AR3) from the AR2 to the AR3 is completed, connection to the AR2 that had been a default router (DR) until this point is broken. Therefore, to check the connection with the AR2, the MN transmits a NS addressed to the AR2. Because the AR2 responding to the NS no longer has a connection relationship with the MN, the MN does not receive a response packet. The MN acknowledges that the connection with the DR(=AR2) has been broken as a result of three NS failures (Detect unreachability to AR2).

Subsequently, the MN transmits a RS to acquire router information of a new link and confirms that the MN is newly in a "Prefix 3" link by an RA responded by the AR3. At this time, that there are no changes in "IP link" can be recognized through use of a same "Landmark Option" by DNA. The MN creates an address IP3 from the received "Prefix 3" (Create new IP address). A state of the IP address of the MN at this time is held at "Preferred" for all IP1, IP2, and IP3, between "Preferred state/Deprecated state". Therefore, the MN can use any address for a new communication.

After creating the address IP3, the MN checks for duplicate addresses through DAD. As a result, the AR3 acknowledges that the AR3 itself is the HAR of the IP3. Then, the AR3 acknowledges that an IP address (IP1) using a different "Prefix" is present at a timing at which a data packet that the MN is communicating is outputted. As a result, the AR3 acquires a relevant other HAR (=AR1) of the MN from the table set in advance and performs a "Location Update" of the IP1 to the HAR (=AR1). As a result, regarding the IP1, a new tunnel to the AR3 to which the MN has newly moved is established, allowing communication to be restarted.

However, at this time, when communication is performed using an application in which few packets are transmitted by the MN (for example, a user datagram protocol [UDP] in which the MN mainly receives data), the AR3 cannot know that the MN is using that address for communication until the MN outputs data (Data [IP-1]). Therefore, as shown in FIG. 9, a packet addressed to the IP2 received by the AR2 as before is destroyed because a transfer destination is unknown. The MN acknowledges that communication between the AR3 and the AR2 is required for the first time when the MN transmits a packet having the IP2 as a source address and establishes a tunnel. In this way, when a normal MN to which no changes have been made is used, in addition to signaling for performing movement management of a plurality of tunnels increasing, packet loss increases because reconfiguration of the tunnel cannot be performed immediately after movement.

DISCLOSURE OF THE INVENTION

The present invention has been achieved to solve the above-described problems. An object of the present invention is to provide a mobile communication method and an access router that can reduce signaling for reconfiguring a tunnel during a mobile node movement when a normal mobile node (that does not newly provide a dedicated function) is used, and further reduce packet loss.

To achieve the above-described object, a mobile communication method of the present invention is a mobile communication method that controls a handover when a mobile node moves from under the control of a first access router that is a movement origin to be under the control of a second access router that is a movement destination. The mobile communication method includes a step of: receiving, by the second access router, a packet for connection confirmation outputted to the first access router; acquiring, by the second access router that receives the packet for connection confirmation, an address of the first access router from the received packet for connection confirmation, and transmitting a position updating message to the first access router; transmitting, by the first access router receiving the position updating message, prefix information related to a single or a plurality of internet protocol addresses used by the mobile node to the second access router; mapping the prefix information on a tunnel configured between the first access router and the second access router, and transferring a packet destined for the mobile node via the tunnel; and transferring the packet transferred via the tunnel between the first access router and the second access router from the second access router to the mobile node.

As a result of the method, signaling for reconfiguration of the tunnel during mobile node movement is performed from the second access router that is the movement destination to the first access route that is the movement origin. Therefore, signaling can be reduced. Moreover, packet loss can also be reduced.

The mobile communication method further includes a step of: transmitting, after the prefix information related to a single or a plurality of internet protocol addresses used by the mobile node from the first access router is received, from the second access router to the mobile node, a router advertisement message including a prefix of the second access router itself and information indicating that a prefix of the first access router and an internet protocol address generated from the prefix of the first access router are no longer preferred; and generating, by the mobile node, a new internet protocol address based on the prefix of the second access router within the router advertisement message, setting the new internet protocol address to a "preferred" state, and setting the internet protocol address generated from the prefix of the first access router to a "deprecated" state based on the information within the router advertisement message indicating that the internet protocol address generated from the prefix of the first access router is no longer preferred.

As a result of the method, a "Netlmm" requiring that a configuration of the mobile node not be changed can be handled.

In the mobile communication method of the present invention, the access router manages the internet protocol address and a valid time for a mobile node currently using the tunnel among the mobile node connected to the access router itself, and transmits a router advertisement message for extending the valid time of the internet protocol address to a relevant mobile node every time a prescribed refresh time elapses, with the information stating "deprecated".

In addition, the first access router monitors communication using an address generated from the prefix of the first access router itself and, regarding an address of which communication is not performed even once from a start of the communication to a predetermined communication monitoring time, transmits a message for deleting tunnel mapping to the second access router.

Furthermore, when receiving the position updating message from the second access router that is a movement destination access router, the first access router that is a movement origin access router gives notification that refreshing is not required to be performed at the movement destination when communication is not performed even once during the communication monitoring time regarding the address generated from the prefix of the first access router itself or, even when the communication monitoring time has not elapsed, when the mobile node is that which moves without performing communication even once.

As a result of the method, tunnels can be reduced.

An access router of the present invention is a second access router in a mobile communication network that controls handover when a mobile node moves from under the control of a first access router that is a movement origin to be under the control of the second access router that is a movement destination. The access router includes a means for receiving a packet for connection confirmation transmitted by the mobile node to the first access router; a means for acquiring an address of the first access router from the received packet for connection confirmation and transmitting a position updating message to the first access router; a means for receiving prefix information transmitted from the first access router in response to the position updating message, the prefix information related to a single or a plurality of internet protocol addresses used by the mobile node; a means for mapping the received prefix information on a tunnel configured with the first access router, and transferring a packet destined to the mobile node via the tunnel; and a means for transferring the packet transferred via the tunnel to the mobile node.

As a result of the configuration, signaling for reconfiguration of the tunnel during mobile node movement is performed from the second access router that is the movement destination to the first access route that is the movement origin. Therefore, signaling can be reduced. Moreover, packet loss can also be reduced.

The access router further includes a means for transmitting a router advertisement message to the mobile node, after receiving the prefix information related to a single or a plurality of internet protocol addresses used by the mobile node from the first access router, the router advertisement message including a prefix of the access router itself and information indicating that a prefix of the first access router and an internet protocol address generated from the prefix of the first access router are no longer preferred. The mobile node generates a new internet protocol address based on the prefix of the access router itself within the router advertisement message, sets the new internet protocol address to a "preferred" state, and sets the internet protocol address generated from the prefix of the first access router to a "deprecated" state based on the information within the router advertisement message indicating that the internet protocol address generated from the prefix of the first access router is no longer preferred.

As a result of the configuration, a "Netlmm" requiring that a configuration of the mobile node not be changed can be handled.

In addition, the access router further includes a means for managing the internet protocol address and a valid time for a mobile node currently using the tunnel among the mobile node connected to the access router itself, and transmitting a router advertisement message for extending the valid time of the internet protocol address to a relevant mobile node every time a prescribed refresh time elapses, with the information stating "deprecated".

An access router of the present invention is a first access router in a mobile communication network that controls handover when a mobile node moves from under the control of a first access router that is a movement origin to be under the control of the second access router that is a movement destination. The access router includes: a means for monitoring communication using an address generated from the prefix of the first access router itself and, regarding an address of which communication is not performed even once from a start of the communication to a predetermined communication monitoring time, transmitting a message for deleting tunnel mapping to the second access router.

In addition, the access router of the present invention, when receiving the position updating message from the second access router that is a movement destination access router, gives notification that refreshing is not required to be performed at the movement destination when communication is not performed even once during the communication monitoring time regarding the address generated from the prefix of the first access router itself or, even when the communication monitoring time has not elapsed, when the mobile node is that which moves without performing communication even once.

As a result of the configuration, the tunnels can be reduced.

In the present invention, signaling for reconfiguring a tunnel during a mobile node movement when a normal mobile node (that does not newly provide a dedicated function) is used can be reduced. Moreover, packet loss can also be reduced. A "Netlmm" requiring that a configuration of the mobile node not be changed can be handled and, furthermore, tunnels can be reduced.

BRIEF DESCRIPTION OF THE DRAWINGS

FIG. 2 is an explanatory diagram of an example of an MN management table in an access router in FIG. 1;

FIG. 4 is an explanatory diagram of a router advertisement message transmitted by the access router in FIG. 1;

BEST MODE FOR CARRYING OUT THE INVENTION

Figure 1:
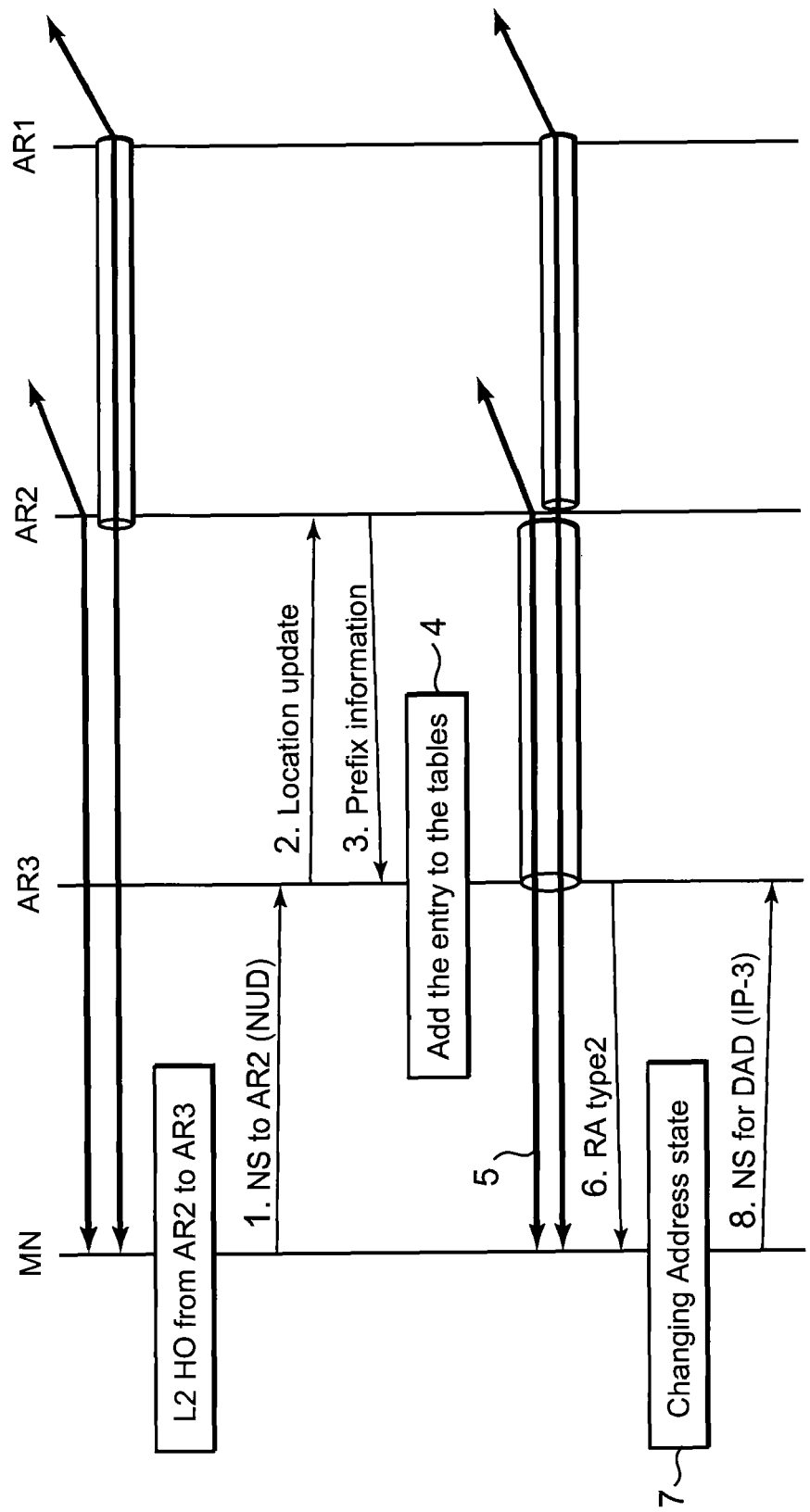
FIG. 1 is an explanatory diagram of a communication sequence of a mobile communication method and a router according to an embodiment of the present invention.
Figure 9:
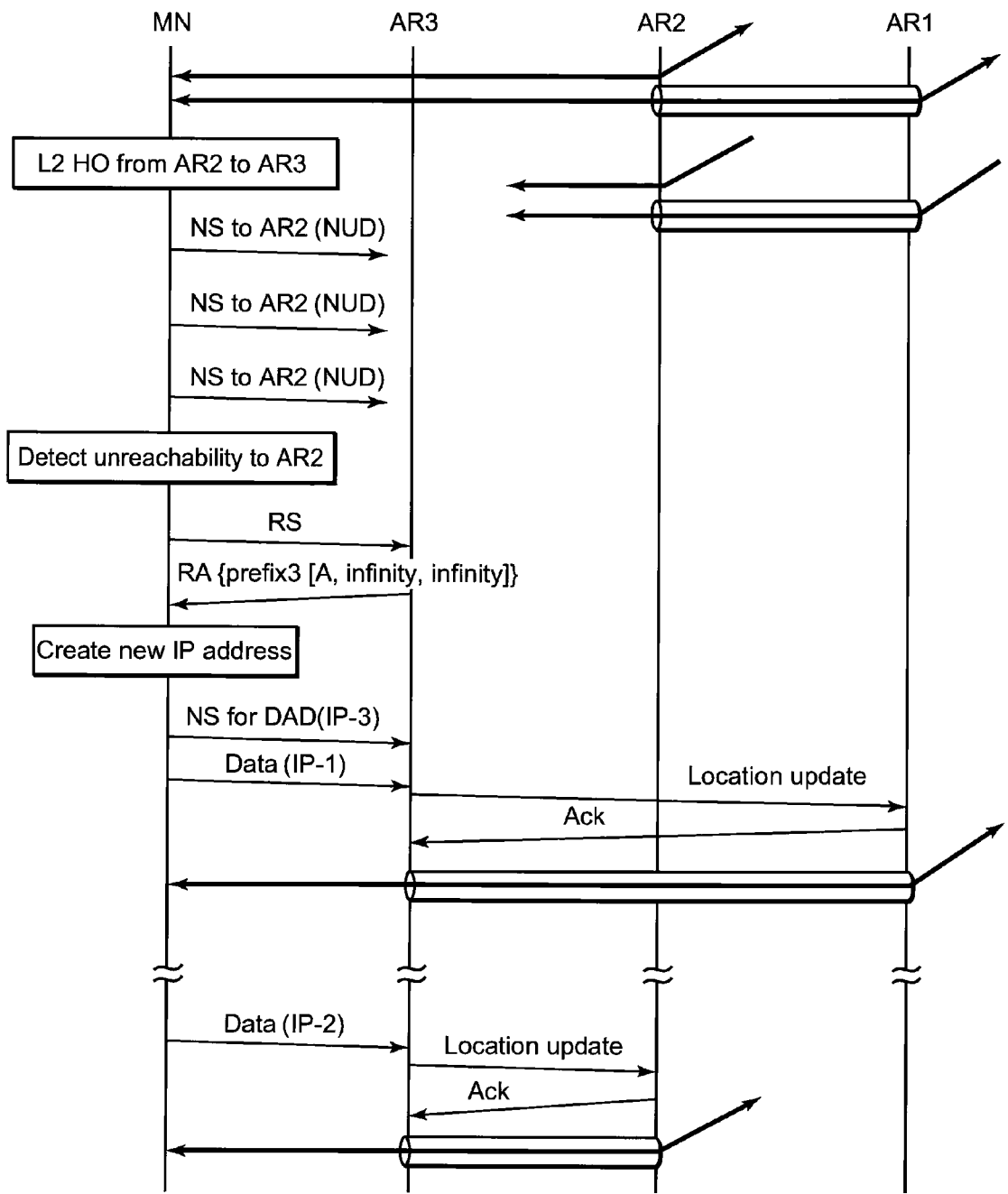
FIG. 9 is an explanatory diagram of another problem of the mobile communication method in FIG. 6.

Embodiments of the present invention will be described hereafter with reference to the drawings. FIG. 1 is an explanatory diagram of a communication sequence of a mobile communication method and an access router according to an embodiment of the present invention. Like FIG. 9, FIG. 1 shows an operation performed when an MN moves from a movement origin AR2 (oAR) to a movement destination AR3 (nAR). Therefore, before the MN moves to the AR3, the MN has created an IP1 and an IP2, each based on respective "Prefix" from an AR1 and the AR2, and sets states of the IP1 and the IP2 to "Preferred". In the present invention, it is assumed that the AR1, the AR2, and the AR3 operate in "promiscuous" mode and receive all frames from the MN.

1. As a result, the AR3 receives an NS packet addressed to the AR2 from the MN. A link local address of the AR2 is used as a destination address of the NS packet. As a result of the AR1, the AR2, and the AR3 setting in advance a table in which the link local address and the IP addresses of the AR1, the AR2, and the AR3 are mapped and holding the table, an AR from which the MN moved can be recognized in advance.

2. The AR3 that has identified the AR2 as the movement origin AR (oAR) is the AR2 transmits a "Location Update" to the AR2. At this time, the "Location Update" includes a "Link Local IP address" of the MN, an address (MAC address) of a "Link Layer" of the MN as an MN ID, and the like.

3. The AR2 that has received the "Location Update" creates "Prefix Information" using an MN management table (FIG. 2 described hereafter) of the relevant MN and transmits the created "Prefix Information" to the AR3. Content of the "Prefix Information" will be described hereafter (FIG. 4).

4. From the "Prefix Information", the AR3 knows the IP address that the relevant MN is currently using (may use). The AR3 creates an entry for the relevant MN in the MN management table and adds the entry.

5. At this time, between AR2 and AR3, tunnel mapping is configured related to all IP addresses of the MN of which notification has been given in the "Prefix Information". The packet destined to the MN starts being transferred from the AR2 to the Ar3 via the tunnel. As a result of the tunnel, packets addressed to all IP addresses used by the MN can be transferred from the AR2 without the MN notifying the AR3 of the IP addresses used by the MN itself.

6. Subsequently, the AR3 transmits a type-2 RA message of (RA_Type2), described hereafter (FIG. 4), to the MN using the "Prefix Information". The "RA_Type2" RA message includes a "Prefix" of the AR2 and a "Prefix" of an address with which communication is continued using another tunnel, in addition to the normal "Prefix" of the AR3. Moreover, to allow the MN to recognize that the MN is always in a same "IP Link", a common "Prefix" of the "Netlmm" domain in which an A bit is not set (described in detail hereafter with reference to FIG. 4) is included.

7. The MN that has received the "RA_Type2" RA message, after acknowledging the "Prefix" of the new AR3 included in the "Prefix Option", uses the "Prefix" to generate an address (IP3).

8. The MN performs DAD (NS for DAD). The AR3 uses a packet of the DAD and newly adds information of the IP3 to the MN management table of the MN.

Here, the MN that has received the "RA_Type2" RAmessage at 6 changes the state of the IP addresses held by the MN itself at 7 by another "Prefix Option". In FIG. 1, because, other than the "Prefix" of the AR3 that has been newly received, a "Preferred Life Time" (PL Time) shown in FIG. 4 is 0, the address states change from "Preferred" to "Deprecated". RFC2461 prescribes that the IP addresses that are in the "Deprecated" state "cannot be used when the MN generates a new connection". This indicates that, when the MN newly starts a communication, the MN uses an IP address using a "Prefix" obtained from an AR to which the MN is currently connected, of which the tunnel is not required to be established, and a new communication can be efficiently performed. However, an address that is in the "Deprecated" state can be used for continued communication. Therefore, an IP address to which communication is continued is required to be held. In the present invention, unlike the conventional technology, a "Valid Time" of the "Prefix Option" is not set to "Infinity". Therefore, when the MN continues use of the relevant "Prefix", the AR is required to transmit the RA message including the "Prefix" before the "Valid Time" expires and is required to perform "refresh".

In the present invention, because the AR to which the MN is currently connected manages the IP address (Prefix information) used by the MN, the required RA is generated and the address state ("Preferred"/"Deprecated") of the MN is controlled. As a result, tunnel generation and maintenance can be controlled on the network side without depending on an address state within the MN. Moreover, because the connected AR always manages the information of the MN and the tunnel, during movement, signaling is not required to be performed to all HAR as was required before. Tunnel extension can be performed and the required "Prefix" information can be acquired by notification being given only to the movement origin. Signaling for reconfiguring the tunnel can be reduced. Because the NS packet for confirming connection to the oAR (AR2) outputted by the MN is used to discover the nAR (AR3), signaling starts more quickly. Even when data transmission from the MN is not performed, tunnel mapping for all addresses can be configured. Therefore, packet loss can be reduced. Because all data destined to the MN is transmitted to the movement origin AR (AR2), packet loss can be reduced by packet buffering being performed at only at the movement origin AR (AR2) during movement.

Figure 3:
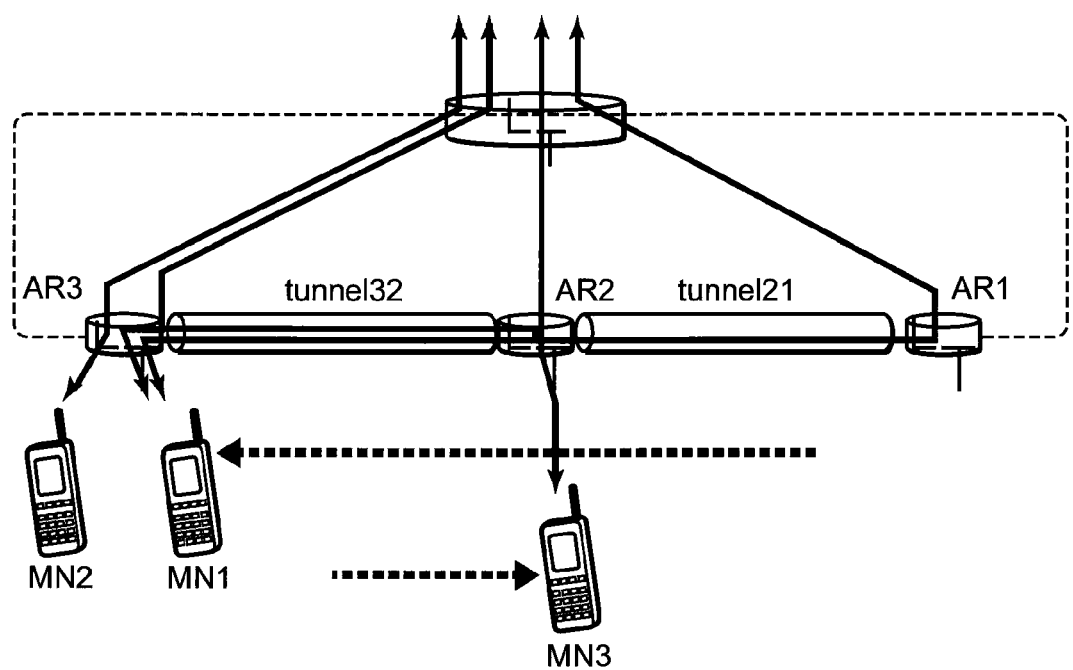
FIG. 3 is an explanatory diagram of a network that is in a state shown in the MN management table in FIG. 2.

Next, the MN management table managed by the AR will be described with reference to FIG. 2. Here, FIG. 2 shows an example of the MN management table managed by the AR3 in a network configured as shown in FIG. 3. In the MN management table, entries are MN-specific(separated into MN1, MN2, and MN3 in the configuration shown in FIG. 3). Each field will be described below. MN ID is a unique identifier (ID) of the MN (for example, a MAC/LL address). An On Link Flag indicates whether the MN is currently connected to itself (AR3, herein) (in the configuration in FIG. 3, the MN1 and the MN2 are connected: On Link Flag=1; MN 3 is not connected: On Link Flag=0). When the AR itself cannot confirm connection, and when a "Location Update" is received from another AR, the AR changes the On Link Flag to 0.

A refresh timer (RT) is a timer configured separately from the MN. When an address other than the address created from the "Prefix" of the AR itself is used, the RT is used to control a valid life timer (VL timer in FIG. 4) thereof. The RT indicates an amount of time until "expire", using a value used in the "Prefix Option" of the RA as reference. "IP address (es) using tunnel" indicates an IP address mapped on a tunnel from another AR. The connected AR can acquire "Prefix" information for "refresh" using the address. The subsequent "OP address generated by this AR" indicates an IP address created using the "Prefix" acquired from the connected AR.

A transmission timer indicates an amount of remaining tome from when a packet of the IP address created using the "Prefix" acquired from the connected AR is transmitted and received until the tunnel is deleted. An initial value of the timer is. The transmission timer is reset to a predetermined tunnel life time every time the packet is transmitted and received, and decrements with a passage of time. In other words, when the value of the transmission timer is 0, communication has not been performed even once, or the predetermined tunnel life time or more has elapsed since communication ended.

The instance in FIG. 2 will be described in further detail. As shown in FIG. 3, the MN1 is an MN that has moved from under the control of the AR1 to be under the control of the AR2, and then to be under the control of the AR3. The MN1 has started communication while connected to the AR1 and the AR2, and the communication operations are being continued. The table in FIG. 2 indicates that the MN1 is connected (On Link) and two addresses, MN1-1 and MN1-2, are using the tunnel. Moreover, the table indicates that 35 minutes and 40 seconds (=refresh timer) remain until "refresh" is performed to maintain the address. An address (IP address generated by this AR) generated using the Prefix of the AR3 is MN1-3. Communication using this address has not been performed even once, or the tunnel life time or more has elapsed after communication (transmission timer=0).

Next, the table indicates that the MN2 is "On Link", and there are no tunnels using another address. An address generated from the AR 3 (IP address generated by this AR) is MN2-3. A remaining tunnel life time (transmission timer) using this address is 55 minutes and 12 seconds.

The table indicates that the MN3 is a terminal that is not connected to itself (AR3) (On Link Flag=0). Because the MN3 is not connected to the AR3 itself, the AR3 is not required to output the RA for "Refresh". The "Refresh timer" is not used. An address generated by the MN3 under the control of the AR3 (IP address generated by this AR) is MN3-3. Because the "Transmission Timer" has not expired (Transmission Timer=15 minutes and 56 seconds), the tunnel is still required to be maintained.

When the "Transmission Timer" of the MN that is not "On Link" "expires", this indicates that the network side is no longer required to maintain the tunnel. Therefore, the AR transmits a message for deleting mapping of the tunnel of the relevant MN to an AR that is a partner on the tunnel to which the AR is connected. The AR that has received the message deletes the relevant address from its own MN management table when the AR itself is not connected to the relevant MN. The AR further similarly transmits a mapping deletion message to an AR at a connection destination of the tunnel. When all addresses subjected to management is deleted for a certain MN, the AR deletes the entry of the relevant MN.

Next, an RA message outputted by the AR will be described with reference to FIG. 4. In the present invention, the AR outputs three types of RA messages (RA_Type1, RA_Type2, and RA_Type3). The "RA_Type1" is content of an RA message that is normally used and periodically outputted. In the present invention, there are two "Prefix Option" by default. One is the "Prefix" (nAR's prefix) of the AR itself. The AR uses the "Prefix Option" by setting the A bit indicating that the MN will generate the IP address using this "Prefix". Moreover, in the "Preferred Life time" (PL time) and "Valid Life time" (VL time), the AR prescribes the "Refresh Time" (RT) that is a time at which the address is refreshed. Because a value of the RT is set to an amount of time that is sufficiently longer than an interval of the "RA_Type1" RA that is periodically transmitted, ordinarily, the "Prefix" received from the connected AR is always refreshed during reception. In addition to the unique "Prefix" of the AR, a special "Prefix" (Special prefix of this netlmm domain) that is shared within the "netlmm" domain is used. The A bit in this "Prefix" is not set. Therefore, the MN does not generate and use an address using this "Prefix". However, because the "Prefix" is managed within a "Prefix" list, the MN can recognize that the MN is in a same "IP link" by receiving the same "Prefix" during movement (*1 in FIG. 4).

As described earlier, the "RA_Type2" RA serves as point of the present invention, and is transmitted during PI reception from the oAR. In the "RA_Type2", the "Prefix Option" is used to give notice related to a "prefix" of the movement origin AR (oAR) (oAR's prefix) and, when the tunnel is used, the "Prefix" (Other Prefix (es) using tunnel) of the IP address using the tunnel, in addition to the "nAR's prefix" and the "Special prefix of this netlmm domain" in "RA_Type1". In the prefix (oAR's prefix) of the oAR that is the movement origin, the A bit is set. However, the "Preferred Life time" is set to 0. As a result, when the MN moves, the state of the address generated at the movement origin (oAR) is always changed to "deprecated". Therefore, only the address newly generated from the nAR of the connection destination is in the "preferred" state. When the MN starts a new communication, the MN communicates using the address of the AR (nAR) to which the MN is currently connected. Therefore, packet transfer in a new communication can be performed without using the tunnel. Network resources can be effectively used. Moreover, when an old communication is completed, because communication using the address is not started from the MN, communication using the tunnel gradually decreases.

The "Valid Life time" (*2 in FIG. 4) in the "prefix" of the oAR is as follows. The "Valid Life time" changes depending on the content of the "Prefix information" received from the oAR. The oAR (AR2 in FIG. 2) that has received the "Location Update" from the nAR (AR3 in FIG. 1) notifies the nAR of the following information as the "Prefix Information":
(1) IP address using the tunnel
(2) IP address generated from the oAR
(3) "Transmission state"

The "Transmission state" indicates a tunnel maintenance state of the address generated from the oAR in (2). Specifically, the "Transmission state" indicates whether the "Transmission timer" is 0 when the "Location Update" is received. When the "Transmission timer" is 0, tunnel establishment and maintenance for the address generated under the control of oAR is not performed. Therefore, regarding the "Valid Life time" in the "prefix" of the oAR, when the "Transmission state" is 0, the "Valid Life time"=0. When the "Transmission state" is 1, notification is given using the value of the "Refresh Time" (RT) (*2 in FIG. 4). The "Valid Life time"=0Valid Life time"=0 in a current standard specification simply indicates that the value is not updated, rather than the address being made "invalid" and deleted. Therefore, regarding a "prefix" in which "Valid Life time"=0 has once been set during movement, the process involves only waiting until the value previously received during connection to the oAR "expires".

When the "Transmission state" is 1, tunnel maintenance and establishment is required to be performed. A process similar to that for the IP address using the tunnel in (1) is performed. Regarding the "prefix" of the IP address using the tunnel in (1), notification is given with the A bit being set, the "Preferred Life time"=0, and the "Valid Life time"=RT. However, when the address is not included in the "Prefix Information", the "Prefix Option" is not used. The address indicates an IP address that is mapped to the tunnel between the oAR and the nAR and is already in the "preferred" state, but continues communication. Therefore, the address is required to be "refreshed" such that the "Valid Life time" does not "expire" during communication.

Regarding the "refresh" timing for the "deprecated" address of the MN, as indicated by "RA_Type2", the address is always "refreshed" during movement to a new AR. As a result, only the connected AR is required to consistently manage the address states of the MN, without timer management of the addresses being performed individually. The address state management within the MN and the management of the tunnel on an actual network are separate.

When the "Refresh timer" of the AR itself "expires", the AR transmits the "RA_Type3" message using only the "prefix" related to the IP address of the "IP address using tunnel" set in the table, and updates the address state of the MN. For example, when the AR is an nAR that has received information that is "Prefix Information" in which nothing is set in "IP address using tunnel" and the "transmission state" is 0, the nAR newly adds an MN entry in the MN management table shown in FIG. 2. Nothing is set in the "refresh timer" and "IP address(es) using tunnel" fields. When the MN generates an address using the "Prefix" of the nAR itself and performs DAD, the nAR merely adds the generated address to the "IP address generated by this AR".

Figure 5:
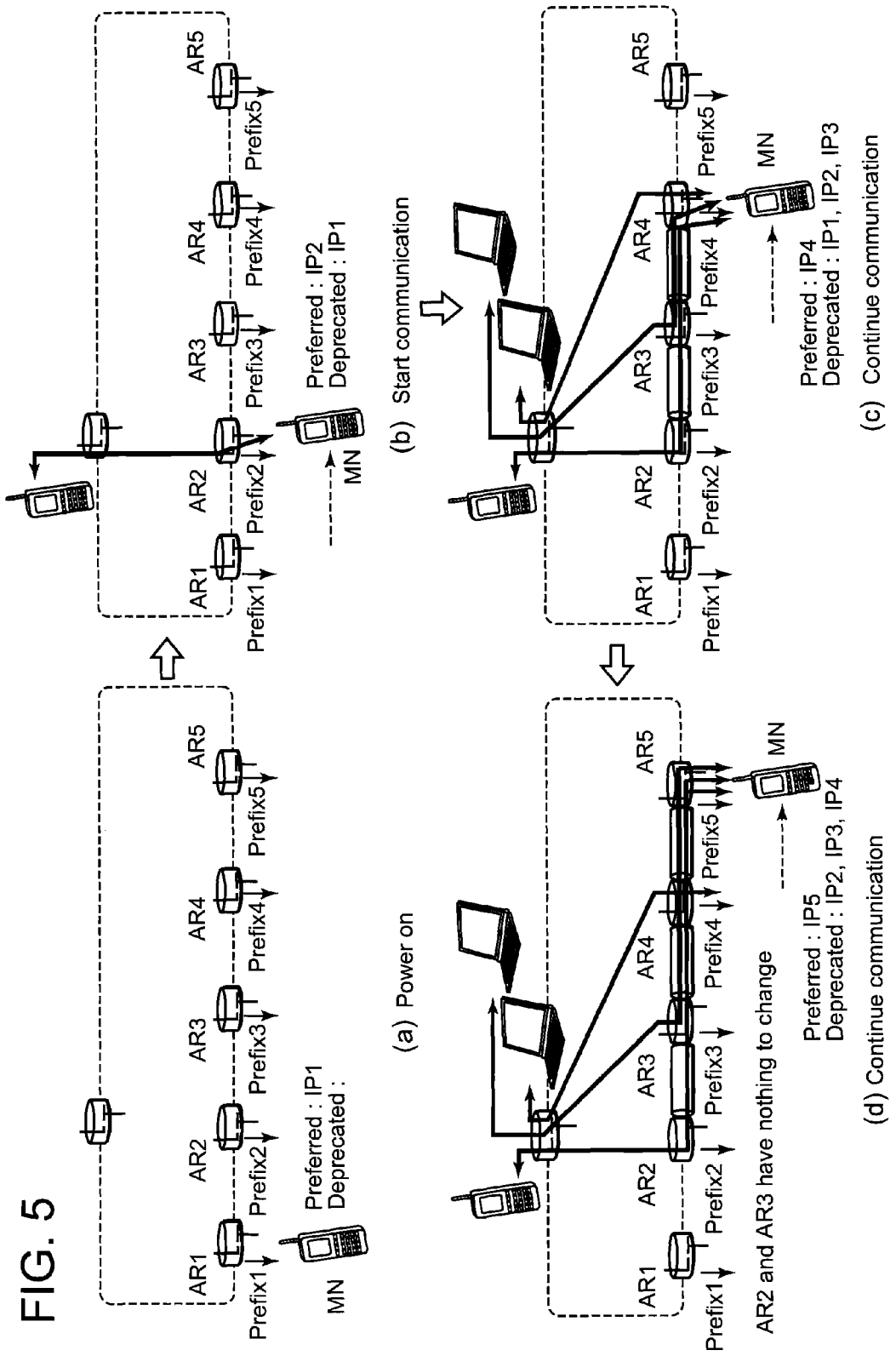
FIG. 5 is an explanatory diagram of operations of the mobile communication method and the access router in FIG. 1.
Figure 6:
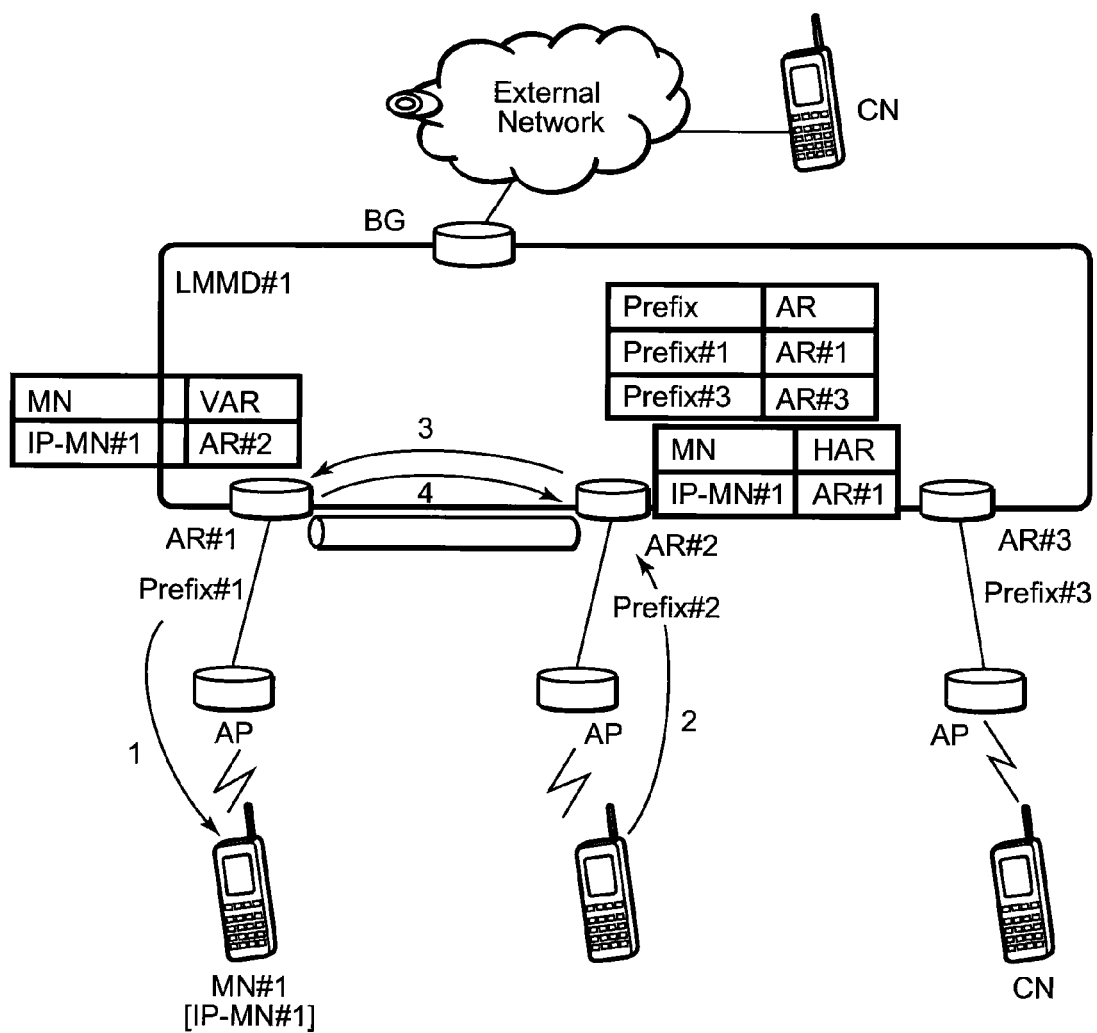
FIG. 6 is an explanatory diagram of a communication sequence of a conventional mobile communication method.
Figure 7:
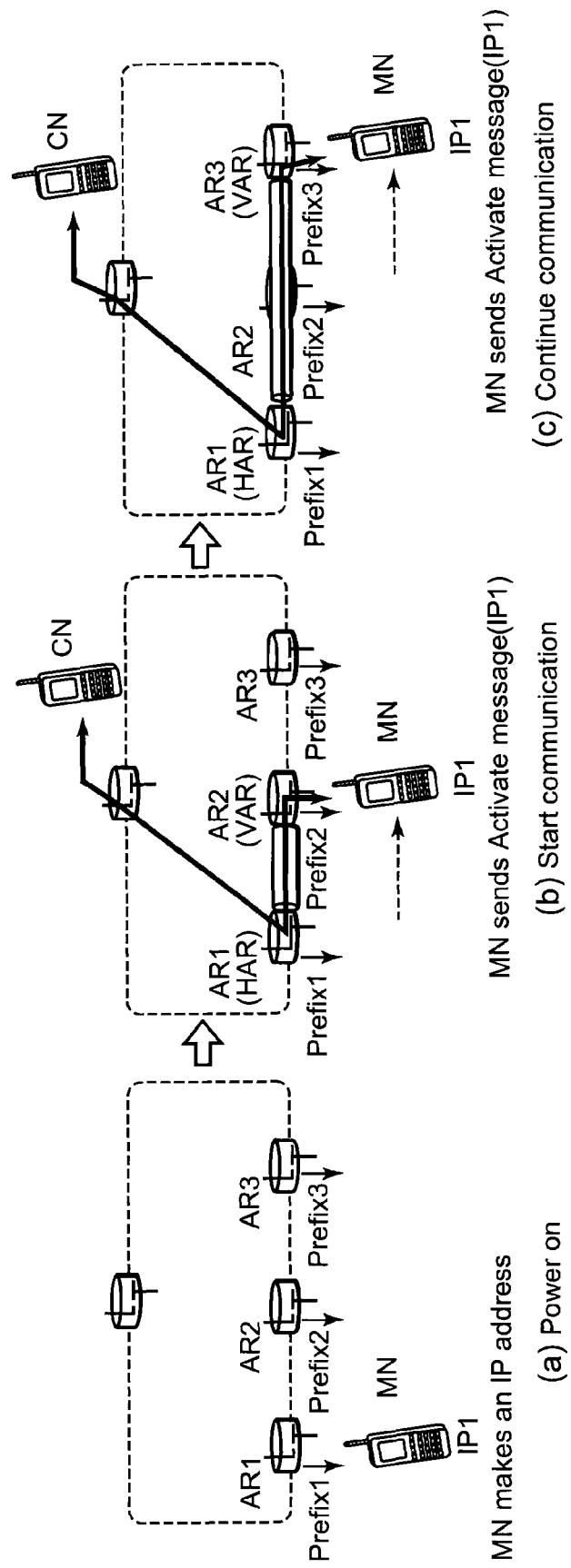
FIG. 7 is an explanatory diagram of details of the communication sequence of the mobile communication method in FIG. 6.
Figure 8:
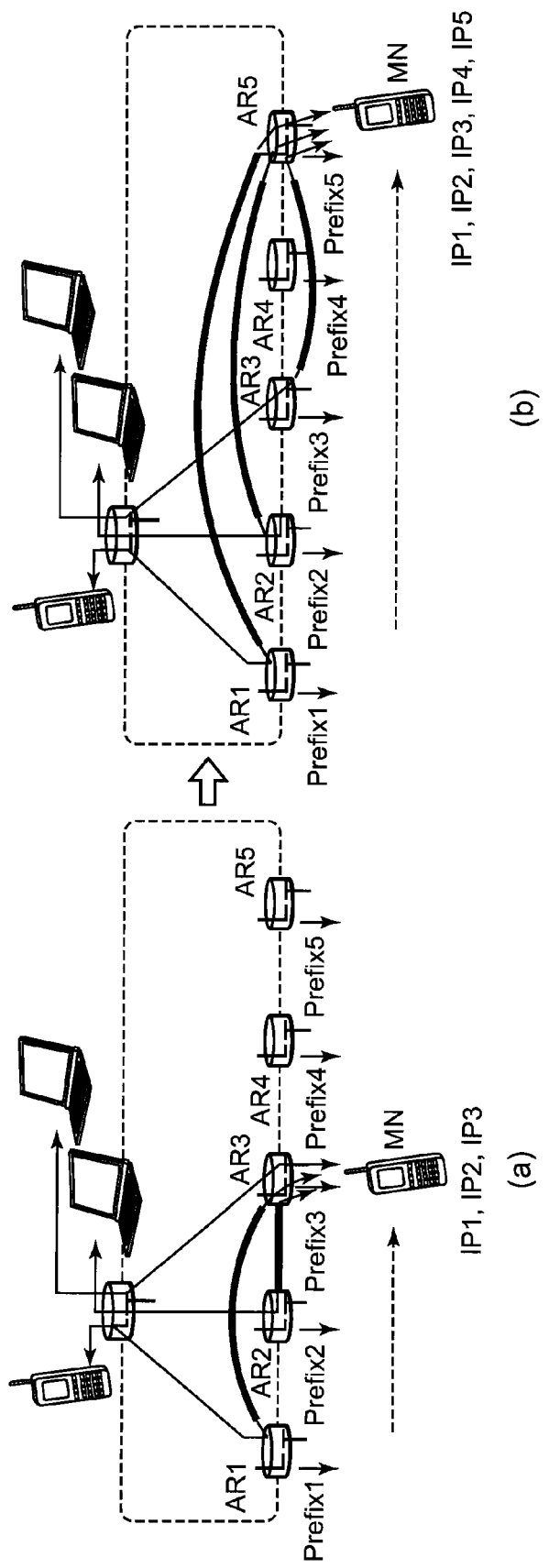
FIG. 8 is an explanatory diagram of a problem of the mobile communication method in FIG. 6.

In this way, in the present invention, the nAR acquires only required information from the oAR. Management of the MN address state is performed using the RA, and a required minimum of tunnels are configured. A specific operation example will be described with reference to FIG. 5. FIG. 5 shows an operation performed when the MN is started. FIG. 5(a) shows when power is turned ON (Power On). The MN generates a first address IP1 using the "Prefix1" of an AR1 under the control of the AR1. The state of the IP1 is "preferred". However, communication is not performed at this time.

After the MN moves to be under the control of the AR2 in FIG. 5(b), the state of the address OP1 changes from "preferred" to "deprecated" by the "RA_type2" RA. Only an address OP2 generated using a "Prefix2" of the AR2 is in the "preferred" state. The MN that starts communication at this time performs communication using the address IP2. Therefore, the HAR is the AR2. Unlike in the conventional technology, the communication can be performed without a tunnel being configured between the AR1 and AR2. Because communication using the address OP1 is not being performed at this time, the "transmission state"=0. The "valid timer" is not "refreshed" even once after movement. Because only information on the address IP2 is entered in the MN management table of the AR2 (because the IP1 is not in a state allowing use of the tunnel: "transmission state"=0), the AR2 is not an address performing "refresh" management, and the "refresh timer" is not operated.

Next, FIG. 5(c) shows when the MN moves successively to AR4. The MN generates addresses IP1 to IP4 from respective "prefix1" to "prefix4" of AR1 to AR4. However, when the MN connects to the AR4, only the IP4 is in the "preferred" state. In FIG. 5(c), the communication using the addresses generated under the control of the AR2 and under the control of the AR3 is continued. Respective addresses IP2 and IP3 are mapped on the tunnels between the AR2 and the AR3 and between the AR3 and the AR4 and transferred. Because the communication is continued at this point, the AR4 performs "refresh" on the addresses IP3 and IP4 using the "refresh timer". Regarding the address states of the MN, the "Valid timer" is updated for addresses other than the address IP1.

Finally, FIG. 5(d) shows when the MN moves to the AR5. At this time, the MN similarly generates an address using a "prefix5" of the AR5. However, the address IP1 that is not "refreshed" is deleted from the addresses of the MN when the "Valid Life timer" "expires". When a tunnel is established between the AR4 and the AR5, the AR2 and the AR3 are unaffected. Signaling for reconfiguring the tunnel is not required. The MN simply continues updating the "Transmission timer" of the IP addresses (in this case, IP2 and IP3)

generated using the "prefix". When the "Transmission timer" "expires", the AR5 gives notification of deletion of mapping of the relevant address to a partner (AR2, AR3, and AR4) with which the tunnel is configured.

Industrial Applicability

The present invention achieves an effect in which, when a normal mobile node (that does not newly provide a dedicated function) is used, signaling for reconfiguring a tunnel during a mobile node movement is reduced and, furthermore, packet loss is reduced. The present invention can be used in a "Netlmm" that requires that a configuration of the mobile node not be changed, and the like.

The invention claimed is:

1. A mobile communication method that controls a handover when a mobile node moves from under the control a first access router, which is a movement origin, to under the control of a second router, which is a movement destination, the mobile communication method comprising:

receiving, by the second access router, a packet for connection confirmation outputted to the first access router;

acquiring, by the second access router that receives the packet for connection confirmation, an address of the first access router from the received packet for connection confirmation, and transmitting a position updating message to the first access router;

transmitting, by the first access router receiving the position updating message, prefix information related to a single or a plurality of internet protocol addresses used by the mobile node to the second access router;

mapping the prefix information on a tunnel configured between the first access router and the second access router, and transferring a packet destined for the mobile node via the tunnel;

transferring the packet transferred via the tunnel between the first access router and the second access router from the second access router to the mobile node;

transmitting, after the prefix information related to the single or the plurality of internet protocol addresses used by the mobile node from the first access router is received, from the second access router to the mobile node, a router advertisement message including a prefix of the second access router itself and information indicating that a prefix of the first access router and an internet protocol address generated from the prefix of the first access router are no longer preferred; and generating, by the mobile node, a new internet protocol address based on the prefix of the second access router within the router advertisement message, setting the new internet protocol address to a "preferred" state, and setting the internet protocol address generated from the prefix of the first access router to a "deprecated" state based on the information within the router advertisement message indicating that the internet protocol address generated from the prefix of the first access router is no longer preferred.

2. A mobile communication method that controls a handover when a mobile node moves from under the control a first access router, which is a movement origin, to under the control of a second router, which is a movement destination, the mobile communication method comprising:

receiving, by the second access router, a packet for connection confirmation outputted to the first access router;

acquiring, by the second access router that receives the packet for connection confirmation, an address of the first access router from the received packet for connection confirmation, and transmitting a position updating message to the first access router;

transmitting, by the first access router receiving the position updating message, prefix information related to a single or a plurality of internet protocol addresses used by the mobile node to the second access router;

mapping the prefix information on a tunnel configured between the first access router and the second access router, and transferring a packet destined for the mobile node via the tunnel; and transferring the packet transferred via the tunnel between the first access router and the second access router from the second access router to the mobile node, wherein the access router manages the internet protocol address and a valid time for a mobile node currently using the tunnel among the mobile node connected to the access router itself, and transmits a router advertisement message for extending the valid time of the internet protocol address to a relevant mobile node every time a prescribed refresh time elapses, with the information stating "deprecated".

3. An access router that is a second access router in a mobile communication network that controls handover when a mobile node moves from under the control of a first access router, which is a movement origin, to under the control of the second access router, which is a movement destination, the access router comprising:

means for receiving a packet for connection confirmation transmitted by the mobile node to the first access router;

means for acquiring an address of the first access router from the received packet for connection confirmation and transmitting a position updating message to the first access router;

means for receiving prefix information transmitted from the first access router in response to the position updating message, the prefix information related to a single or a plurality of internet protocol addresses used by the mobile node;

means for mapping the received prefix information on a tunnel configured with the first access router, and transferring a packet destined to the mobile node via the tunnel;

means for transferring the packet transferred via the tunnel to the mobile node; and means for transmitting a router advertisement message to the mobile node, after receiving the prefix information related to a single or a plurality of internet protocol addresses used by the mobile node from the first access router, the router advertisement message including a prefix of the access router itself and information indicating that a prefix of the first access router and an internet protocol address generated from the prefix of the first access router are no longer preferred, wherein, the mobile node generates a new internet protocol address based on the prefix of the access router itself within the router advertisement message, sets the new internet protocol address to a "preferred" state, and sets the internet protocol address generated from the prefix of the first access router to a "deprecated" state based on the information within the router advertisement message indicating that the internet protocol address generated from the prefix of the first access router is no longer preferred.

4. An access router that is a second access router in a mobile communication network that controls handover when a mobile node moves from under the control of a first access router, which is a movement origin, to under the control of the second access router, which is a movement destination, the access router comprising:

means for receiving a packet for connection confirmation transmitted by the mobile node to the first access router;

means for acquiring an address of the first access router from the received packet for connection confirmation and transmitting a position updating message to the first access router;

means for receiving prefix information transmitted from the first access router in response to the position updating message, the prefix information related to a single or a plurality of internet protocol addresses used by the mobile node;

means for mapping the received prefix information on a tunnel configured with the first access router, and transferring a packet destined to the mobile node via the tunnel;

means for transferring the packet transferred via the tunnel to the mobile node; and means for managing the internet protocol address and a valid time for a mobile node currently using the tunnel among the mobile node connected to the access router itself, and transmitting a router advertisement message for extending the valid time of the internet protocol address to a relevant mobile node every time a prescribed refresh time elapses, with the information stating "deprecated".

* * * * *